March 25, 1941.  W. G. FRANCE  2,235,881
CELLULATED CLAY PRODUCT AND METHOD OF PRODUCING THE SAME
Filed April 9, 1936
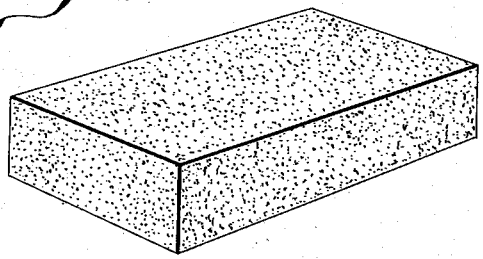
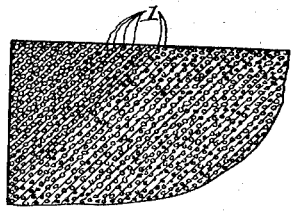
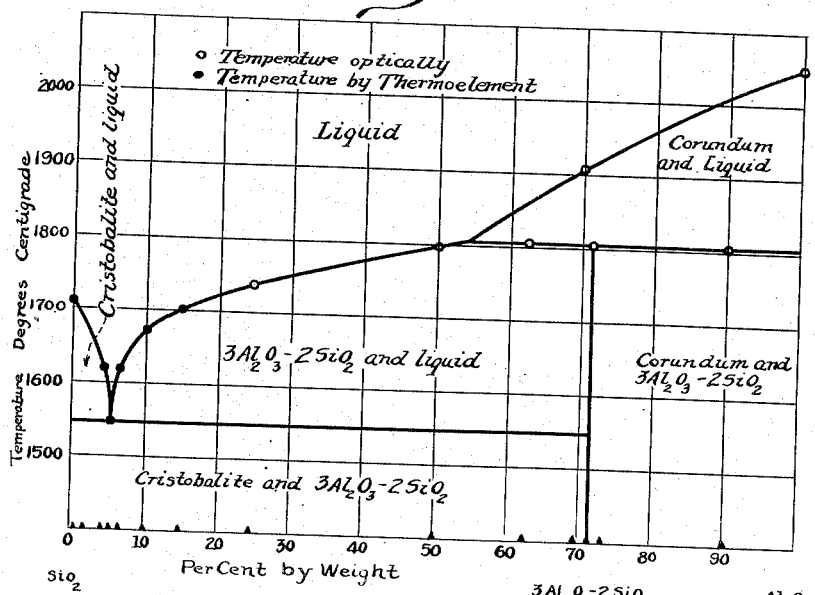
Inventor
Wesley G. France
By W. S. McDowell
Attorney Patented Mar. 25, 1941

2,235,881

UNITED STATES PATENT OFFICE 2,235,881

CELLULATED CLAY PRODUCT AND METHOD OF PRODUCING THE SAME

Wesley G. France, Columbus, Ohio, assignor of one-half to George A. Bole, Columbus, Ohio Application April 9, 1936, Serial No. 73,503

6 Claims. (Cl. 106—9)

This invention relates to the manufacture of cellulated clay products, and has particular reference to an improved cellulated clay product adapted for use as a high grade refractory insulation.

The method and materials now employed for producing cellulated clay products reduce the refractoriness of the clays or other materials from which they are made. In such methods, the additions made to the clay batch, or the products of decomposition involved during the formation of the setting-up medium, lower the refractoriness of the final product. Pertinent illustrations of this are the additions of such materials as sodium silicate, which leaves sodium salts in the refractory batch. These salts act as fluxes and thereby reduce the pyrometric cone equivalent of the final product. Other processes use lime or salts which leave lime as a final flux in the finished ware.

Therefore, by producing a more refractory product, cellulated clay materials may be used in fields of service from which they are now excluded. Such materials are now quite widely used in the manufacture of light weight building or wall-forming units and function very satisfactorily as efficient heat, sound and low temperature refractory insulation but, due to the prior methods and compositions for producing such cellulated products, they have not been considered satisfactory as high-temperature refractory insulation, and it is to the end of adapting cellulated clay products to such augmented use that the present invention is in part directed.

For a further understanding of the invention, reference is to be had to the following description and the accompanying drawing, wherein:

Fig. 1 is a perspective view of a cellulated clay refractory formed in accordance with the present invention;

Fig. 2 is an enlarged sectional view taken through the refractory;

Fig. 3 is a phase rule diagram showing the temperature phase relations of silica and alumina.

In accordance with the present invention, I use nothing but compounds of aluminum and other materials which, with the exception of aluminum oxide, are completely volatilized and removed during the firing of the ware. In prior methods of manufacture, cellulated ceramic refractory insulators are produced which have a service range as high as 2400° F. or 2500° F. However, by the present invention, a refractory insulator is produced which is stable, efficient and usable at temperatures several hundreds of degrees higher than those just given. This is due to the fact that hydrous aluminum oxide gel is the setting-up agent and other added materials, hereinafter specified, are removed during firing. It will be observed by reference to the silica-alumina diagram, set forth in Fig. 3, that any addition of alumina to the system $Al_2O_3$—$SiO_2$ will increase the refractoriness of the system when a high grade clay is involved.

In making any cellulated clay product from a clay slurry, it is essential not only to foam the batch, but also to produce within the batch a setting-up agent which will stiffen the cellulated mass. Prior foams have been made in a number of ways, such as the addition to the clay batch of a foaming agent as saponin, soluble oleates, licorice, and sulphonated organic compounds. While these foaming agents produce a fairly stable foam, they do not in many cases produce one sufficiently strong to resist the mechanical action of the addition of the clay.

In accordance with the present invention, ways have been perfected for making these foams more stable. In carrying out the present invention, gelatin is added to the solution or slurry containing saponin or other foaming agent, and after sufficient beating in a mechanical mixer, a foam is developed that is decidedly more stable than can be obtained without the use of gelatin. After a sufficiently stable foam is formed, it is desirable to add the setting-up or stiffening agent to the slip for the reason that the foamed mass without a stiffening agent will tend slowly to lose its cellular structure, that is, will gradually decrease in volume with high shrinkage. In order to overcome this difficulty, the present invention resides primarily in developing a hydrous aluminum oxide gel within the foamed clay body. By this expedient, the batch is not only set up in a prompt and effective manner but, in addition, the refractoriness of the fired product is increased.

In order to produce the hydrous aluminum oxide gel, one may start with a solution of aluminum sulfate, aluminum chloride, aluminum nitrate, or any soluble aluminum salt, such as the alums or the aluminates, and to which is gradually added a solution of ammonium carbonate or one of ammonium hydroxide. In order to produce the most favorable gel, it has been found advisable to arrest the neutralization just short of an alkaline reaction, and, furthermore, to avoid deflocculation of the clay batch.

One of several procedures may be adopted in practicing the present invention. For instance, in a preferred practice, there is added to 65 cc. of a saturated solution of aluminum sulfate, having a specific gravity of 1.274 at 24° C. (or other soluble aluminum salt) 0.1 gram of saponin. To this mixture, there is added 65 cc. of water; 7 cc. of a 6 per cent. solution of gelatin, all of which materials are intimately mixed to form a batch, which is then foamed to the desired degree by means of mechanical agitation or beating. To this mixture there is added approximately 25 cc. of a saturated solution of ammonium hydroxide (specific gravity 0.932 at 24° C.) or an equivalent quantity of ammonium carbonate solution, this being considerably short of the amount of ammonium hydroxide or ammonium carbonate required to complete neutralization. To this there is added about 250 grams of a mixture of plastic clay and clay grog. This latter mixture may be of any percentage proportion of the two constituents, or it may be plastic clay alone, in which case less clay is added. When the batch is well stirred, there is introduced therein a sufficient quantity of ammonium hydroxide to set up the batch, for instance I have used 7 cc. of the saturated solution of ammonium hydroxide or an equivalent amount of ammonium carbonate solution. During the addition of the ammonium hydroxide or carbonate, the batch gradually stiffens until the final amount is added, when the consistency will be about the same as that of a very stiff cream. The amount of ammonium carbonate or ammonium hydroxide solution required in any given instance is determined by titrating the aluminum sulfate solution with the base.

A second procedure consists in adding 29 cc. of ammonium hydroxide solution (specific gravity 0.932 at 24° C.) to 65 cc. of water. To this dilute ammonium hydroxide solution is added 1/10 of a gram of saponin and 7 cc. of a 6 per cent. gelatin solution. To this liquid medium is added 100 grams of plastic clay (Lawrence) minus 20 mesh. This batch is then foamed by beating in a mechanical mixer, and to this foamed system is added 200 grams of a clay grog (minus 20 mesh) suspended in 65 cc. of aluminum sulfate solution having specific gravity of 1.274 at 24° C. This grog slip is slowly added to avoid breaking down the foam. Finally 6 cc. of ammonium hydroxide solution is slowly added, which results in the production of the gel and thereby stiffens the mass.

A third procedure, varying somewhat from the others, resides in adding 50 cc. of water to 65 cc. of aluminum sulfate solution, the latter having a specific gravity of 1.274 at 24° C. To the sulfate solution is added 1/10 of a gram of saponin and 7 cc. of 6 per cent. gelatin solution. To this liquid medium is added 200 grams of a grog made from minus 20 mesh, and the resulting mixture is beaten in a mechanical agitator until sufficiently foamed. A slip made of 100 grams of plastic clay, 29 cc. of ammonium hydroxide, specific gravity 0.932 at 24° C. and 15 cc. of water, is slowly added to the foamed batch while agitation is continued. 5 cc. of ammonium hydroxide solution is then slowly added, producing the gel which stiffens the mass. Plastic clay may be used alone, without grog, if desired.

A batch, made in accordance with any of the above methods, is now cast in molds where it will set up in about ten minutes to form a self-sustaining mass from which the molds can be removed in less than thirty minutes. By the addition of a total of 34 cc. of ammonium hydroxide solution to the batch developed in the first described procedure, the consistency of the batch will be sufficiently stiff to permit the same to be extruded from a standard plunger type of a brick making machine.

The consistency of the final batch will depend upon the amount of clay used, the character or quality of the clay, the degree of foaming, the concentration of the aluminum sulfate, and the amount of ammonium hydroxide added. These conditions are susceptible to alteration so that a fast or slow rate of setting may be obtained at will.

In the procedures above set forth, concentrations other than those described can be used. For instance, use may be made of the saturated aluminum sulfate solution undiluted with water, in which case there will be required, of course, more ammonium hydroxide, resulting in the formation of a much stiffer gel. The aluminum sulfate solution may vary all the way from a saturated solution down to substantially one-third of such concentration.

Too dilute solutions ordinarily can not be used, since it is well known in colloidal chemistry that hydrous oxide gels are formed under conditions representing a high super-saturation of the precipitating phase, a low solubility of this phase, and the possession of marked hydrophilic properties by the colloidally dispersed micelles of this phase. The latter two conditions are specific properties inherently characteristic of the oxide and are not readily capable of wide variation under the conditions employed in this process.

Neither the precise mechanism involved in the gel formation nor the intimate structural details of gels are as yet known, nevertheless, it is reasonable to postulate the following mechanism for increasing the degree of super-saturation of the precipitating phase and the resultant production of the gel state. While subsequent scientific development may make it advisable to modify the hypothesis hereinafter given, it is offered solely in order that the full purpose and accomplishment of the present invention may become apparent.

The super-saturation is obtained by slowly adding the base, with rapid stirring or beating, to the aluminum salt solution. As fast as the drops of the base react with the aluminum salt solution to form the precipitating phase, the particles of this phase are in part colloidally dispersed and in part dissolved rather than precipitated as a crystalline mass. Subsequent additions of the base continue to increase the degree of super-saturation until the whole system sets to a gel. If the aluminum salt solution is too dilute, a crystalline, or at best a flocculent, precipitate results.

From these considerations, it would appear that the best procedure to follow is that first described above. However, it will be apparent to those versed in the art of colloidal chemistry that the reverse procedure: namely, the addition of aluminum salt solution to the base, is not precluded, so long as it is possible to attain a high degree of super-saturation of the precipitating phase. This condition may be produced by the presence of a second solid substance, such as clay, having marked water absorbing capacity. This is borne out by the fact that I have produced a setting-up action or a gelation employing this reverse procedure in a cellulated clay system. In view of these conditions, it is considered that such reverse procedure properly falls within the scope of the present invention, and a specific example thereof has been set forth above in the second-described procedure.

In some cases, it is preferable to use ammonium carbonate solution since it will give off carbon dioxide gas on being added to the aluminum sulfate solution. This gas can be used to bring about enhanced cellulation of the product when needed.

The term "clay" is used herein in a generic sense and is intended to include any clay-like substance susceptible to cellulation under the treatments specified. The instant processes may also be employed to make products containing kyanite, andalusite, diaspore and the like, in lieu of or in addition to clay. Basic cellulated refractories can be made by using magnesia, chrome, olivine and the spinels instead of clay.

By way of variation from the above procedures, I have partially reacted the aluminum sulfate with ammonium hydroxide and foamed the resulting mixture, after which the clay was added. Another variation of the described procedure is to mix a small amount of ammonium carbonate with ammonium hydroxide, thus obtaining an advantage in the foaming step. Solid ammonium carbonate or solid aluminum sulfate may of course be used in these processes in lieu of their solutions.

While a combination of saponin and gelatin has been specifically mentioned as a foaming agent, the invention is not restricted solely to such an agent, inasmuch as I have obtained satisfactory results with other hydrophilic substances, such as egg albumen, serum albumen, agar agar and glues, used in combination with saponin and other foaming agents. While ammonium hydroxide has been mentioned as a reacting agent, it must be understood that gaseous ammonia and liquid ammonia can be used. It is, furthermore, apparent that sodium or potassium hydroxide, or any other soluble base, could be used if it were not for the fact that the defractoriness of the final products would be thus reduced.

I have made hydrous titanium oxide gels and used them in a clay mix for the production of cellulated products in a way analogous to the above described preparations of hydrous aluminum oxide gels in cellulated clay products. An example of such a hydrous titanium oxide gel is as follows: 20 cc. titanium tetra-chloride, 40 cc. water, which may be reacted with 69 cc. ammonium hydroxide solution, as mentioned above, or with ammonium carbonate solution of equivalent strength, a very rigid gel was formed immediately.

While I find that at the present time the hydrous aluminum oxide gels are more desirable commercially, the titania gels may be ultimately feasible in commercial practice. The cost of soluble titanium compounds which are favorable for forming the gels, is quite high at present. Such gels are considered to fall within the purview of the present invention and may ultimately become commercially feasible. I have prepared titania gels, formed them into ceramic ware and fired the ware. The structure was equally as good as that of any cellulated clay product now commercially available and a more refractory product was formed. I have also made a great number of specimens of the hydrous aluminum oxide gel products and have dried and fired them. Observation and tests disclose that these products dry more safely (without cracking) than will a product made from silica gels.

I desire to point out that whereas aluminum sulfate has been used in the various arts as an acid medium, the use thereof in the present invention is intended primarily for the production of a hydrous aluminum oxide gel and is therefore largely independent of its use as an acid in accordance with the procedures set forth.

Cellulated products produced in accordance with the present invention are characterized by a very fine pore structure, as indicated at 1 in the drawing. The fineness of the cells depends to a considerable extent on the fineness of the clay used and the degree and character of the foam.

While the present invention has been described as being particularly applicable to the production of a high grade cellulated refractory insulation, nevertheless, the said invention can also be used for producing structural cellulated clay products, acoustic tile, wall insulation and many other uses to which cellulated clay products are generally adapted.

What is claimed is:

1. A cellular refractory ceramic product produced from a clay slurry which has been foamed, gelled, dried and fired and wherein the foaming and gel producing agents with the exception of alumina are removed from the final product, the clay being the major constituent of the product.

2. The method of making a light weight, cellular refractory, ceramic material, which comprises mixing a soluble aluminum salt solution with clay or the like, introducing a foaming agent into said mixture, beating the resulting mixture to effect foaming thereof, and introducing a volatile reagent that will effect stiffening of the foamed mass, said reagent being added in an amount sufficient only to colloidally disperse precipitated particles without producing crystallization, and then drying and firing the product to remove the foaming and stiffening reagents.

3. The method of making a light weight, cellular refractory ceramic material which comprises mixing clay or the like with a soluble aluminum salt, foaming such mixture by the addition thereto of saponin and gelatin, mechanically agitating the mixture and then adding thereto a removable reagent to effect the setting or stiffening of the mixture, and then drying and firing the product mixture to remove the reagent and increase the refractory value of the product.

4. As a new article of manufacture, a cellular ceramic refractory stable at temperatures appreciably above 2500° F. and produced from an aluminum silicate slurry which has been foamed, jelled, dried and fired, said aluminum silicate slurry having been set by hydrous aluminum oxide gel reacting therewith to increase the proportion of alumina to the system $3Al_2O_3$—$2SiO_2$, and said refractory containing substantially no foaming and gelling reagents capable of fluxing the aluminum silicate at high temperatures.

5. As a new article of manufacture, a refractory ceramic product stable above 2500° F. comprising a foamed mixture of clay set by hydrous aluminum oxide gel and dried and fired whereby foaming and gel producing agents with the exception of alumina are removed from the final product, the alumina coacting with the clay to increase the refractory characteristics of the system $3Al_2O_3$—$2SiO_2$.

6. The method of making a light weight refractory ceramic material having a serviceable range appreciably above 2500° F. which comprises incorporating with a foamed clay a hydrous aluminum oxide gel as a foam stiffening agent, and drying and firing the product to volatilize and remove all foam and gel producing materials with the exception of aluminum oxide to increase the alumina component of the system $3Al_2O_3$—$2SiO_2$; and increase the refractory characteristics of the product.

WESLEY G. FRANCE.